S. ROOT.
Fire-Escape.

No. 201,050. Patented March 5, 1878.

WITNESSES:
W. W. Hollingsworth
Solon C. Kemon

INVENTOR:
S. Root
BY
ATTORNEYS.

UNITED STATES PATENT OFFICE.

SYLVESTER ROOT, OF KENTLAND, INDIANA.

IMPROVEMENT IN FIRE-ESCAPES.

Specification forming part of Letters Patent No. 201,050, dated March 5, 1878; application filed December 27, 1877.

*To all whom it may concern:*

Be it known that I, SYLVESTER ROOT, of Kentland, in the county of Newton and State of Indiana, have invented a new and Improved Fire-Escape; and I do hereby declare that the following is a full, clear, and exact description of the same.

The invention is an improvement in the class of fire-escapes by which persons are lowered from buildings to the ground by means of a rope wound around a rotating shaft or pulley, and in that particular class of such machines in which a rotating drum is employed, said drum having a central circumferential rib, and two ropes which are attached to the same, and wind around it in separate grooves and in opposite directions, so that the ropes are always kept free from entanglement, and one will be wound on the drum as the other is unwound therefrom.

The invention consists in mounting such a drum in a frame which is attached to the wall of the building by a hinge of peculiar form, as hereinafter described.

Figure 1:
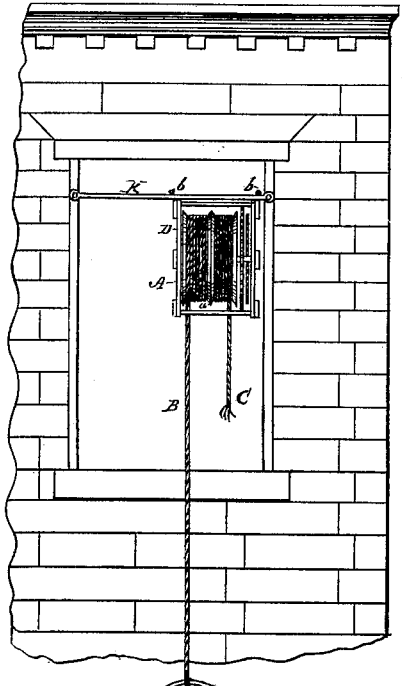
Figure 2:
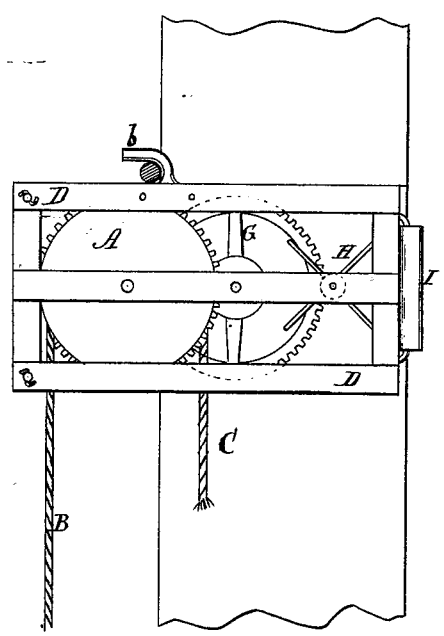
Figure 3:
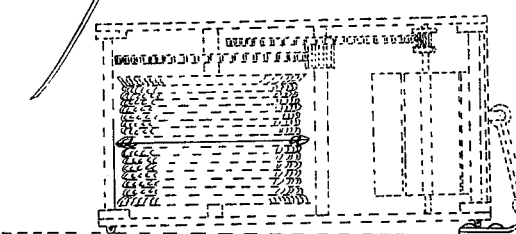
Figure 3:
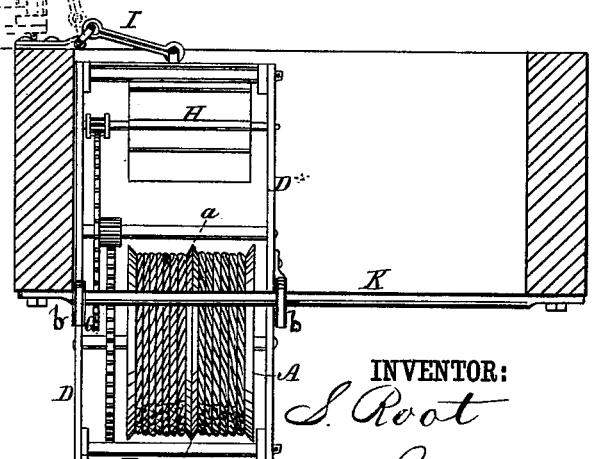

In the accompanying drawing, forming part of this specification, Figure 1 is an elevation of a portion of the wall of a building, showing the apparatus in position for operation. Fig. 2 is a side elevation of the apparatus in such position. Fig. 3 is a plan view, also showing, in dotted lines, the position of the apparatus when not required for use.

The double drum A is constructed with two grooves or channels, separated by the central circumferential rib $a$. A rope, B, is wound in one direction around one part of the double drum, and a rope, C, in the opposite direction around the other part.

The drum-shaft is shown mounted in suitable bearings in a rectangular frame, D. By a train of spur-gears, G, the drum is connected with a fly-brake, H, whose shaft is arranged parallel to the drum-shaft, and also has its bearings in the frame D. The fly-brake is set in motion whenever the double drum rotates in one direction or the other, and retards its speed.

The above-named parts constitute the elements of the fire-escape proper.

The frame D may be attached to the floor beneath, or contiguous to, an outer door or window, and the ropes or their equivalents allowed to pass over a roller to lessen the friction.

I show, however, a mode of attachment which I prefer, namely, one end of the frame D is attached to the side of the window-casing by means of a double-jointed hinge, I, so that when not in use the apparatus may be swung around out of the window-niche and against the wall, as shown in dotted lines, Fig. 3.

In practical use the position of the frame is as shown in full lines, Figs. 1, 2, 3, the frame D projecting through the window-opening, with its outer end supported from a horizontal bar, K, which is bolted to the outer side of the casing. Hooks $b\ b$ are attached to the upper part of the frame D, and engage or lock with the cross-bar K, to assist in supporting the frame, as shown.

As previously intimated, the ropes B and C are used alternately for lowering persons to the ground. When one rope—say B—is being unwound from the double drum, the other, C, is being wound thereon, and vice versa. Thus the rope C, which is being wound on the double drum, operates by its gravity to retard the rotation of the double drum, and thereby assists in preventing too rapid descent to the ground of the person being lowered. So soon as he has reached the ground the rope C, which has just been rewound upon the double drum, is attached to the next person standing ready to descend, and, the payed-out rope B having been detached from the person last lowered, it will be, in turn, wound on the drum by the rotation of the latter, caused by the weight of the person being lowered by the other rope, C. The fly-brake constantly operates to prevent the drum rotating too rapidly, and hence the fly-brake and idle-rope supplement each the operation and effect of the other.

In some cases the idle-rope may be used alone to brake the drum by tension thereon, as it passes through the hands of persons stationed in proper position for the purpose. It is obvious chains may be used in place of ropes.

What I claim is—

1. The frame D, carrying the fly-brake and double drum, with its attached ropes wound in reverse direction thereon, and the hinge I, attached to the wall or casing so as to allow the frame to be swung out of the window, all combined as shown and described.

2. The combination of the hinged frame, carrying the double drum and provided with the hooks $b\ b$, and the cross-bar attached to the window-casing or wall, as shown and described.

SYLVESTER ROOT.

Witnesses:
JAMES R. POOLE,
JOHN H. POOLE.